US000001845H

United States Statutory Invention Registration [19]

[11] Reg. Number: H1,845

Kelly

[45] Published: Mar. 7, 2000

[54] METHOD AND APPARATUS FOR USING A CONTROL SYSTEM OF AN EARTHWORKING MACHINE AS A TRAINING SYSTEM

[75] Inventor: Thomas J. Kelly, Peoria, Ill.

[73] Assignee: Caterpillar Inc., Peoria, Ill.

[21] Appl. No.: 09/210,281

[22] Filed: Dec. 11, 1998

[51] Int. Cl.[7] ..... B25J 9/00

[52] U.S. Cl. ..... 701/50

[56] References Cited

U.S. PATENT DOCUMENTS 5,528,843 6/1996 Rocke ..... 37/348

5,560,431 10/1996 Stratton ..... 172/2

*Primary Examiner*—Daniel T. Pihulic

*Attorney, Agent, or Firm*—Steven D. Lundquist

[57] ABSTRACT

The present invention is a method and apparatus for training an operator of an earthworking machine having an implement control system. The method and apparatus includes switching from control by the implement control system to control by the operator, monitoring operator control commands, and comparing the operator control commands to control commands of the implement control system. The method and apparatus also includes communicating the comparison to the operator.

15 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD AND APPARATUS FOR USING A CONTROL SYSTEM OF AN EARTHWORKING MACHINE AS A TRAINING SYSTEM

DESCRIPTION

1. Technical Field

This invention relates generally to a method and apparatus for training an operator of an earthworking machine and, more particularly, to a method and apparatus for using a control system of an earthworking machine to compare control by an operator to control by the control system.

2. Background Art

Earthworking machines, such as track-type tractors, wheel loaders, motor graders, excavators, scrapers, compactors, and the like, require much skill to operate. Operators of these machines must be trained and must have a great deal of experience before they are considered proficient at operating the machines.

In recent years, great advances have been made toward automating some of the more difficult or repetitive maneuvers performed by earthworking machines. For example, in U.S. Pat. No. 5,560,431, Stratton discloses a control system which optimizes the dozing function of a track-type tractor by controlling the position of the dozer blade as a function of several sensed and determined parameters of the track-type tractor. The control algorithms incorporated into the invention of Stratton models control strategies developed by highly skilled operators; strategies which are known to provide optimal performance of the machine.

Automated control functions such as in Stratton, however, remove many of the opportunities for human operators to develop true proficiency as machine operators. As a result, in situations where the skills of a human operator are required, the expertise of the human may not be adequate. It is desired to provide a method to train earthworking machine operators efficiently to become highly skilled operators. Preferably, it is desired to incorporate the automated control functions being developed for today's modern machines as an aid in providing this training.

The present invention is directed to overcoming one or more of the problems as set forth above.

3. Disclosure of the Invention

In one aspect of the present invention a method for training an operator of an earthworking machine is disclosed. The method includes the steps of switching from control by an implement control system to control by the operator, monitoring operator control commands, and comparing the operator control commands to control commands of the implement control system. The method also includes the step of communicating the comparison to the operator.

In another aspect of the present invention an apparatus for training an operator of an earthworking machine is disclosed. The apparatus includes a switch for switching from control by an implement control system to control by the operator. The implement control system is adapted to monitor operator control commands, compare the operator control commands to control commands of the implement control system, and communicate the comparison to the operator.

In yet another aspect of the present invention an apparatus for training an operator of an earthworking machine is disclosed. The apparatus includes means for switching from control by an implement control system to control by the operator, means for monitoring operator control commands by the implement control system, means for comparing the operator control commands to control commands of the implement control system, and means for communicating the comparison to the operator.

BEST MODE FOR CARRYING OUT THE INVENTION

Figure 1:
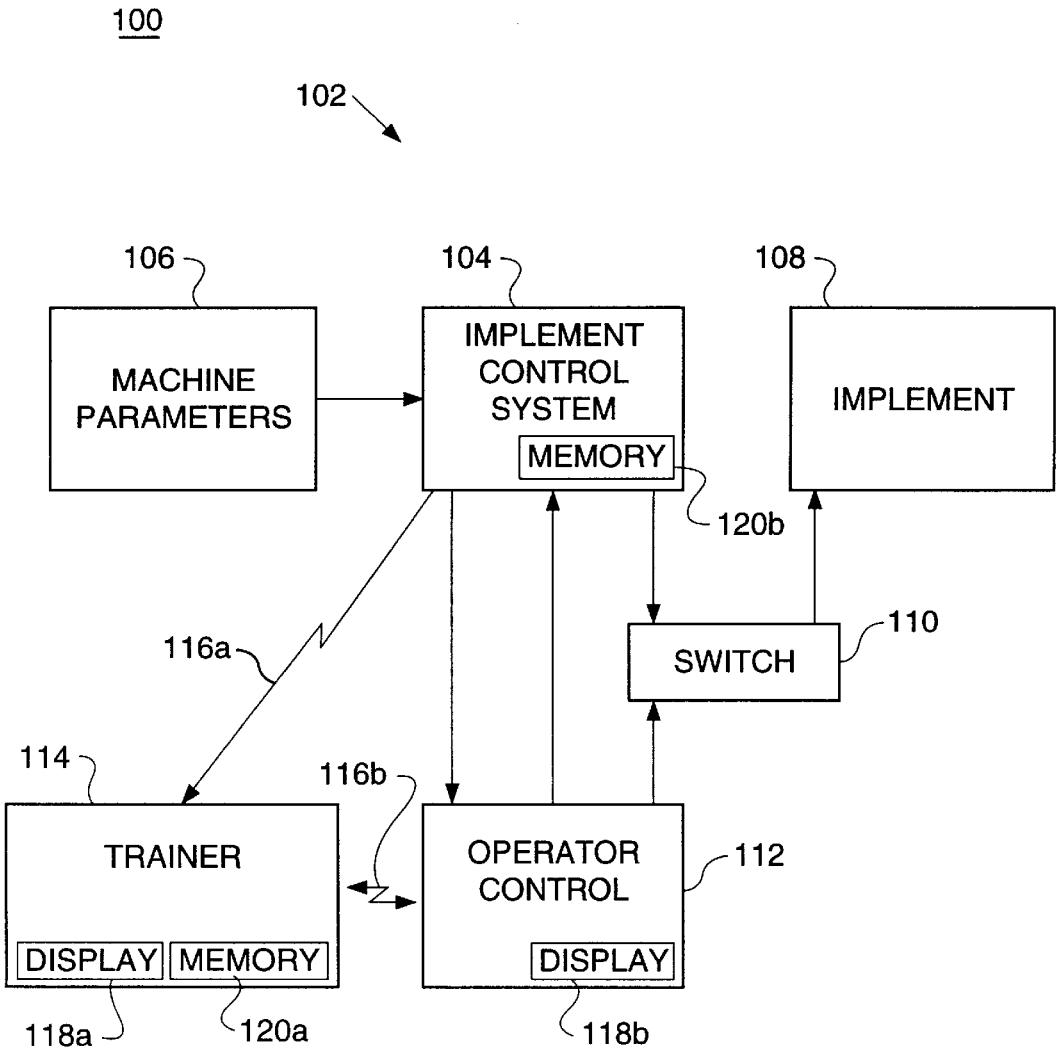
FIG. 1 is a diagrammatic block diagram illustrating an embodiment of the present invention.

Referring to the drawings, and with particular reference to FIG. 1, an apparatus 100 for training an operator of an earthworking machine 102 is shown. The earthworking machine 102 may be any of a variety of types of machines, including, but not limited to, track-type tractors, wheel loaders, excavators, motor graders, scrapers, compactors, and the like.

Preferably, the earthworking machine 102 includes an implement 108 which is controlled to work the earth in some manner. Implements typically include dozer blades, buckets, grader blades, scraper blades, compactor wheels, and the like.

In the preferred embodiment, the implement 108 is normally controlled by an implement control system 104. Recent developments in technology have allowed the development of increasingly complex and powerful implement control systems which have the capability to automate all or part of many earthworking processes. For example, an implement control system 104 may control the blade of a track-type tractor for optimum performance. As another example, an implement control system 104 on a wheel loader or excavator may control the bucket to achieve the most efficient digging and loading operation.

Typically, the operation of an implement control system 104 is determined by feedback received from various earthworking machine parameters 106. Machine parameters may be sensed directly or determined from combinations of other machine parameters, and may include such parameters as engine speed, ground speed, track or wheel slip, torques, implement position, characteristics of the earth, tilt or slope of the machine, physical limitations of the machine or implement, and any number of other parameters of interest.

As an example of the implement control system 104 in operation, a track-type tractor pushes a blade through the earth to cut a path. The implement control system 104 may receive parameters 106 such as ground speed, track slip, and others, and responsively control the depth of the blade to achieve optimum performance. For example, detection of track slip may indicate that the blade is pushing too much earth, and the implement control system 104 will lift the blade to lighten the load. However, other parameters 106 may indicate that the blade is capable of pushing more earth, and the implement control system 104 will lower the blade.

In the preferred embodiment of the present invention, the implement 108 may be controlled by the implement control system 104 or by an operator control 112. A switch 110 provides a way to determine the desired method of control. Preferably, the operator has access to the switch 110 to switch from control by the implement control system 104 to the operator control 112.

During the time period in which the operator control 112 is activated, the implement control system 104 continues to receive the parameters 106 and determine the desired control commands to use. In addition, the implement control system monitors the commands from the operator control 112 and compares the actual operator commands to the implement control system 104 desired commands. The comparison, i.e., the difference between commands from the operator control 112 and commands from the implement control system 104, are communicated to the operator. Additionally, the comparison may be sent to a trainer 114, located at either a remote location or at the earthworking machine 102 with the operator.

The comparison is preferably configured to indicate to the operator and the trainer what the desired changes in operator control commands would be to achieve optimum performance. For example, the comparison may be delivered to a display 118 visible to the operator control 112, the trainer 114, or both. In one embodiment, the display 118 may be graphical and may show superimposed icons of the implement 108 under control of each of the operator control 112 and the implement control system 104. The goal of the operator in this embodiment would be to match the positions of the icons by controlling the implement 108, thus emulating the preferred commands of the implement control system 104. However, other embodiments of delivering the comparison may be used. For example, desired operator commands may be sent which, if followed, would cause the operator to emulate the implement control system 104, or the information may be sent in text form for later analysis.

In an alternative embodiment, the display 118 may incorporate GPS and terrain database technologies to display the machine 102 in the environment in which it is working. GPS and terrain database technologies are well known in the art and will not be discussed further.

Alternatively, the comparison may be stored in a memory 120 at either the operator control 112 or at the location of the trainer 114. The stored comparison may be reviewed at a later time to determine any changes in commands that the operator could incorporate.

Preferably, the comparison may be communicated by any acceptable communication means 116 known in the art, for example, wireless radio, satellite, cellular, and the like.

In an alternative embodiment, the earthworking machine 102 could be set up in a controlled environment and have artificial loads applied for training purposes. Preferably, the controlled setup of the machine 102 would be readily convertible to allow the machine 102 to be used at a work site as desired. In this controlled environment, the implement control system 104 could communicate the comparison between operator commands and machine control commands by way of a wiring harness attached directly to the machine.

In yet another alternative embodiment, the implement control system 104 may be configured to control the earthworking machine 102 to behave as though it were a very large model of machine 102, although the actual machine 102 may be a much smaller, more economical version. In this manner, a smaller, more inexpensive earthworking machine 102 may emulate a large machine 102 for training purposes, thus saving costs.

Figure 2:
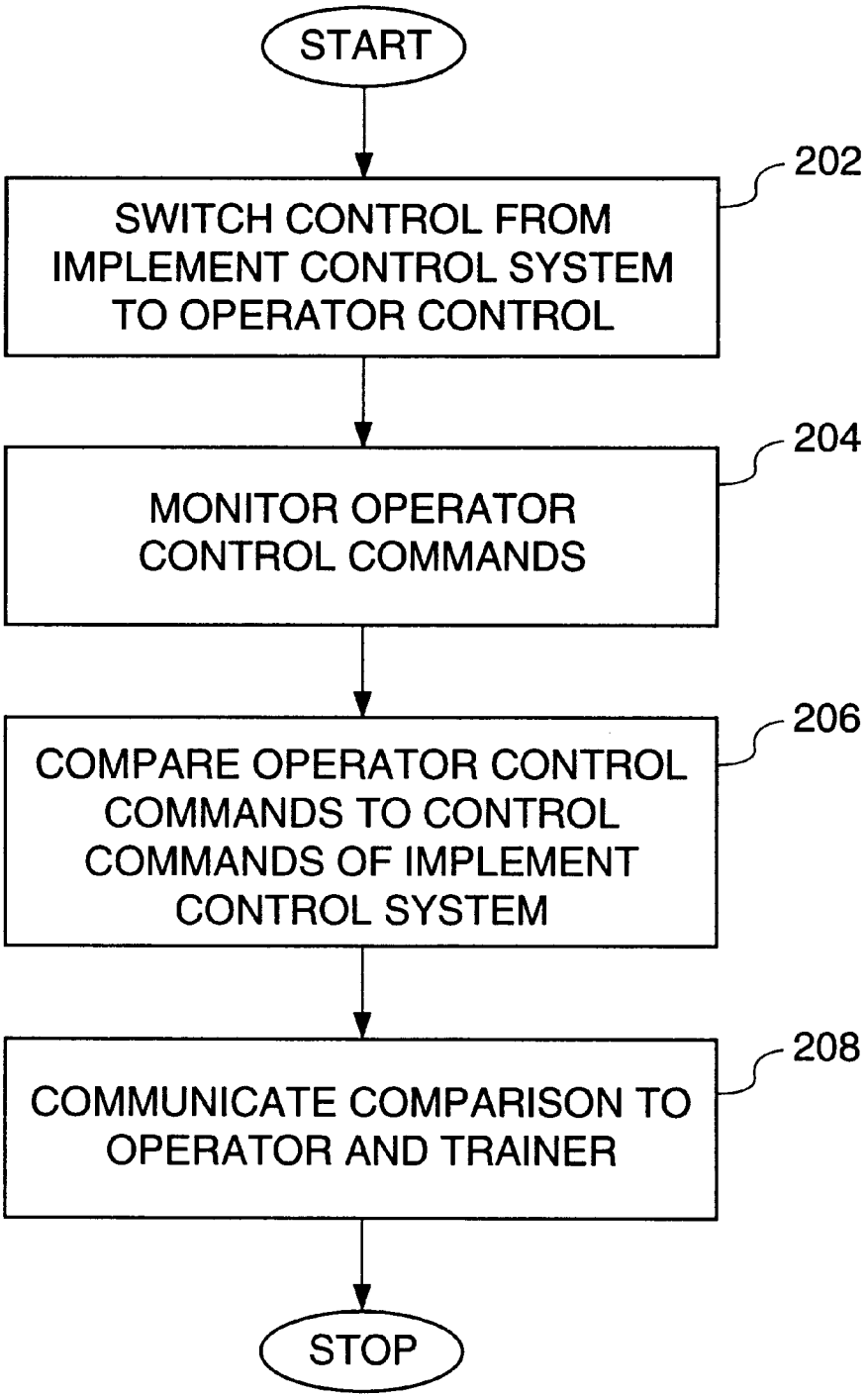
FIG. 2 is a flow diagram illustrating a preferred method of the present invention.

Referring now to FIG. 2, a method for training an operator of an earthworking machine 102 is shown.

In a first control block 202, the operator switches control of an implement 108 from the implement control system 104 to the operator control 112.

In a second control block 204, the implement control system 104 monitors the commands from the operator control 112, and continues to determine desired control commands in response to machine parameters 106.

In a third control block 206, the implement control system 104 compares the commands from the operator control 112 to the desired control commands from the implement control system 104. The difference in the commands is interpreted to be what the operator would need to change in the operator control commands to optimize the performance of the implement 108, and therefore optimize the performance of the earthworking machine 102.

In a fourth control block 208, the comparison is communicated to the operator, a trainer 114, or both.

INDUSTRIAL APPLICABILITY

In operation, the present invention provides a method to train earthworking equipment operators to become more skilled and proficient, while taking advantage of control technologies which are designed to optimize performance. The automated and semi-automated control systems which are in increasing use for control of earthworking implements have removed some of the opportunity to create highly skilled human operators. Periodically, it becomes desirable or even necessary to utilize expert human skills in place of the implement control systems being developed and used. For example, a work site may use machines that do not have automated technologies built in. However, by nominally investing in one or two earthworking machines with the capability to automate functions and use this capability to provide training, a work site can train its operators to be much more proficient on the remaining fleet of machines. The present invention is a unique method to use control systems which were designed to replace skilled human control for the purpose of teaching humans to be more skilled at implement control.

Other aspects, objects, and features of the present invention can be obtained from a study of the drawings, the disclosure, and the appended claims.

I claim:

1. A method for training an operator of an earthworking machine having an implement control system, including the steps of:

switching from control by the implement control system to control by the operator;

monitoring operator control commands by the implement control system;

comparing the operator control commands to control commands of the implement control system; and communicating the comparison to at least one of the operator and a trainer.

2. A method, as set forth in claim 1, wherein the control commands of the implement control system are determined as a function of a plurality of earthworking machine parameters.

3. A method, as set forth in claim 2, wherein at least one of the plurality of earthworking machine parameters is sensed.

4. A method, as set forth in claim 2, wherein at least one of the plurality of earthworking machine parameters is determined.

5. A method, as set forth in claim 2, wherein at least one of the plurality of earthworking machine parameters is sensed and at least one other of the plurality of earthworking machine parameters is determined.

6. A method, as set forth in claim 1, wherein the comparison is the difference between the operator control commands and the control commands of the implement control system, the control commands of the implement control system being determined to optimize the operation of the earthworking machine.

7. A method, as set forth in claim 6, wherein communicating the comparison includes the step of displaying the difference to at least one of the operator and the trainer.

8. A method, as set forth in claim 6, wherein communicating the comparison includes the step of storing the difference in a memory for communicating to at least one of the operator and the trainer at a desired time.

9. An apparatus for training an operator of an earthworking machine having an implement control system, comprising:

a switch for switching from control by the implement control system to control by the operator; wherein the implement control system is adapted to monitor operator control commands, compare the operator control commands to control commands of the implement control system, and communicate the comparison to at least one of the operator and a trainer.

10. An apparatus, as set forth in claim 9, further including a display for displaying the comparison to at least one of the operator and the trainer.

11. An apparatus, as set forth in claim 9, further including a memory for storing the comparison.

12. An apparatus for training an operator of an earthworking machine having an implement control system, comprising:

means for switching from control by the implement control system to control by the operator;

means for monitoring operator control commands by the implement control system;

means for comparing the operator control commands to control commands of the implement control system; and means for communicating the comparison to at least one of the operator and a trainer.

13. An apparatus, as set forth in claim 12, further including means for displaying the comparison to at least one of the operator and the trainer.

14. An apparatus, as set forth in claim 12, further including means for storing the comparison in a memory.

15. An apparatus for training an operator of an earthworking machine having an implement control system, comprising:

a switch for switching from control by the implement control system to control by the operator; wherein the implement control system is adapted to monitor operator control commands, compare the operator control commands to control commands of the implement control system, and communicate the comparison to at least one of the operator and a trainer;

a display for displaying the comparison to at least one of the operator and the trainer; and a memory for storing the comparison.

* * * * *